US012698204B2

(12) United States Patent
Rakib et al.

(10) Patent No.: US 12,698,204 B2
(45) Date of Patent: Aug. 4, 2026

(54) ADIABATIC MULTI-STAGE REACTORS FOR HYDROGEN PRODUCTION AND RELATED SYSTEMS AND METHODS

(71) Applicant: Saudi Arabian Oil Company, Dhahran (SA)

(72) Inventors: Mohammad Abdur Rakib, Dhahran (SA); Stephen N. Paglieri, Dhahran (SA); Sai P. Katikaneni, Dhahran (SA); Salman Khaldi, Dammam (SA); Zied Soua, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 732 days.

(21) Appl. No.: 18/072,179

(22) Filed: Nov. 30, 2022

(65) Prior Publication Data

US 2024/0173687 A1 May 30, 2024

(51) Int. Cl.
| | |
|---|---|
| *C01B 3/047* | (2026.01) |
| *B01J 8/00* | (2006.01) |
| *B01J 8/04* | (2006.01) |
| *C01B 3/503* | (2026.01) |

(52) U.S. Cl.
CPC .............. *C01B 3/047* (2013.01); *B01J 8/009* (2013.01); *B01J 8/0492* (2013.01); *C01B 3/503* (2013.01); *C01B 2203/041* (2013.01); *C01B 2203/142* (2013.01); *C01B 2203/143* (2013.01); *C01B 2203/148* (2013.01)

(58) Field of Classification Search
None
See application file for complete search history.

(56) References Cited

U.S. PATENT DOCUMENTS

| | | | |
|---|---|---|---|
| 8,262,755 | B2 | 9/2012 | Repasky et al. |
| 8,287,762 | B2 | 10/2012 | Repasky et al. |
| 10,906,804 | B2 | 2/2021 | Li et al. |
| 2007/0289215 | A1 | 12/2007 | Hemmings et al. |
| 2025/0100874 | A1* | 3/2025 | Kleyensteiber ......... C01B 3/047 |

FOREIGN PATENT DOCUMENTS

| | | | |
|---|---|---|---|
| CN | 111957270 | 11/2020 | |
| GB | 2094829 A | * 9/1982 | ............. C07C 11/04 |
| JP | 2013095618 | 5/2013 | |
| KR | 20210119823 | 10/2021 | |

OTHER PUBLICATIONS

M.E.E. Abashar. "Ultra-clean hydrogen production by ammonia decomposition." Journal of King Saud University—Engineering Sciences (2018) 30, 2-11. Available online Jan. 23, 2016. (Year: 2016).*

(Continued)

*Primary Examiner* — Jennifer A Leung
(74) *Attorney, Agent, or Firm* — Fish & Richardson P.C.

(57) ABSTRACT

The disclosure relates to systems and methods that include using a plurality of reactors for the conversion of a stream of ammonia ($NH_3$) to hydrogen ($H_2$) and nitrogen ($N_2$). The stream of ammonia is heated prior to introduction into each reactor. The reactors can be adiabatically operated.

9 Claims, 6 Drawing Sheets

(56)          References Cited

OTHER PUBLICATIONS

English machine translation for JP 2013-095618 A (May 20, 2013). (Year: 2013).*

Abashar, "Multi-stage membrane reactors for hydrogen production by ammonia decomposition," International Journal of Petrochemistry and Research, 2018, 2(1):109, 7 pages.

Abashar, "The impact of ammonia feed distribution on the performance of a fixed bed membrane reactor for ammonia decomposition to ultra-pure hydrogen," International Journal of Hydrogen Energy, 2019, 44(1):82, 9 pages.

Cechetto et al. "H2 production via ammonia decomposition in a catalytic membrane reactor," Fuel Processing Technology, 2021, 216:106772, 9 pages.

Cerrillo et al., "High purity, self-sustained, pressurized hydrogen production from ammonia in a catalytic membrane reactor," Chemical Engineering Journal, 2022, 431, 134310, 13 pages.

Garcia-Garcia et al., "High purity hydrogen production by low temperature catalytic ammonia decomposition in a multifunctional membrane reactor," Catalysis Communications, 2008, 9(3), 482, 5 pages.

Park et al., "A catalytic composite membrane reactor system for hydrogen production from ammonia using steam as a sweep gas," Journal of Membrane Science, 2020, 614:118483, 42 pages.

Shah et al., "Compact ammonia reforming at low temperature using catalytic membrane reactors," Journal of Membrane Science, 2022, 644:120147, 25 pages.

Zhang et al., "Efficient Ammonia Decomposition in a Catalytic Membrane Reactor to Enable Hydrogen Storage and Utilization," ACS Sustainable Chemistry & Engineering, 2019, 7(6):5975, 11 pages.

Jiang et al., "Novel hollow fiber membrane reactor for high purity H2 generation from thermal catalytic NH3 decomposition," Journal of Membrane Science, Mar. 2021, 629:119281, 8 pages.

SAIP Examination Report in Saudi Arabian Appln. No. 123450914, dated Dec. 8, 2024, 14 pages (with English translation).

* cited by examiner

Figure 6

ADIABATIC MULTI-STAGE REACTORS FOR HYDROGEN PRODUCTION AND RELATED SYSTEMS AND METHODS

FIELD

The disclosure relates to systems and methods that include using a plurality of reactors for the conversion of a stream of ammonia ($NH_3$) to hydrogen ($H_2$) and nitrogen ($N_2$). The stream of ammonia is heated prior to introduction into each reactor. The reactors can be adiabatically operated.

BACKGROUND

Ammonia cracking to release hydrogen is an equilibrium-controlled highly endothermic process, generally favored at higher temperatures, and at lower pressures. The reaction is often conducted in multitudes of catalyst-filled tubes housed inside a furnace, which supplies the heat required to sustain the reactions at the desired temperatures. Relatively high conversions of ammonia can be obtained by removing hydrogen using hydrogen-permeable membranes, thereby shifting the equilibrium towards complete conversion.

SUMMARY

The disclosure relates to systems and methods that include using a plurality of reactors for the conversion of a stream of ammonia to hydrogen and nitrogen. The stream of ammonia is heated prior to introduction into each reactor. The reactors can be adiabatically operated.

The systems and methods can be used in the onsite generation of hydrogen and to address challenges associated with the shipping of hydrogen. The systems and methods of the disclosure can be less difficult and/or costly to fabricate, install and/or operate relative to certain other known systems and methods used for hydrogen production.

In general, the systems and methods include multi-stage heating, conversions and/or membrane separation, which can increase the reaction rates, the hydrogen permeation driving force, hydrogen recovery and/or ammonia conversion relative to systems and methods that do not include these features and/or that include longer permeation tubes, which generally have a decrease in the concentration of ammonia along the length of the reactor tube. The endothermic heat for the reactions can be provided upstream of each individual reactor. The total reactor volume is divided into two or more reactors; thus, the permeation tube lengths can be split into multiple shorter permeation tubes, with fresh sweep gas at the inlet of each shorter permeation tube. The hydrogen-permeation driving force can be renewed with each new section of the hydrogen-permeable membrane at the start of each reactor. The use of shorter hydrogen-permeable membrane hollow fibers can reduce costs associated with fabrication and replacement relative to longer hydrogen-permeable membrane hollow fibers.

The systems and methods can include introducing fresh ammonia feed into each reactor. This can increase the reaction rate, which can allow for shorter bed lengths.

The systems and methods of the disclosure can include reactors with hollow fibers that include a hydrogen-permeable membrane where the catalyst is loaded in an interior space of the reactors and external to the hollow fibers. Such reactors can simplify the loading and unloading of the catalysts relative to reactors that include catalyst in an annular space of each tube, and fabrication and maintenance of such reactors can be relatively simple due to the presence of the hollow fibers rather than co-axial tubes. An additional advantage of this reactor configuration is that for hollow fibers that include a porous ceramic membrane support, the compression strength of the hollow fibers is generally higher when the hollow fibers (and hence the ceramic material) are in compression, rather than in tension, thereby leading to improved mechanical strength. A further advantage of this reactor configuration is that better heat transfer can be achieved with the catalyst located outside the hollow fibers due to better heat distribution across the reactor bed-cross section. A wider range of catalyst shapes and sizes, and the application of a structured catalyst, allowing for better heat transfer, are accessible with this reactor configuration.

In a first aspect, the disclosure provides a system, including an ammonia gas source and a plurality of reactor systems including first and second reactor systems. Each reactor system includes a heater including an inlet and an outlet, and a reactor. Each reactor includes a housing defining an internal space, a first inlet in fluid communication with the internal space of the housing and the outlet of the heater, a first outlet in fluid communication with the internal space of the housing, and an ammonia cracking catalyst disposed in the internal space of the housing. The ammonia gas source is configured to be in fluid communication with the inlet of the heater of the first reactor system. The first outlet of the first reactor system is in fluid communication with the inlet of the heater of the second reactor system.

In some embodiments, the system further includes a third reactor system. The first outlet of the second reactor system is in fluid communication with the inlet of the heater of the third reactor system.

In some embodiments, each reactor further includes: a plurality of hollow fibers within the internal space, each of the hollow fibers defining an interior and including a hydrogen-permeable membrane; and a second inlet and a second outlet that are each in fluid communication with the interiors of the plurality of hollow fibers. For each reactor system, the internal space of the housing that is in fluid communication with the first inlet and the first outlet is a space that is external to a space occupied by the plurality of hollow fibers.

In some embodiments, the catalyst is disposed in the internal space of the housing of the reactors, external to the plurality of hollow fibers.

In some embodiments, the system further includes a first gas source configured to be in fluid communication with the second inlet of each reactor of the plurality of reactor systems.

In some embodiments, the system further includes a second gas source configured to be in fluid communication with the second outlet of each reactor of the plurality of reactor systems. In some embodiments, the ammonia gas source is configured to be in direct fluid communication with each heater inlet.

In some embodiments, the heater for each of the plurality of reactor systems is the same heater.

In some embodiments, a portion of the ammonia provided by the ammonia gas source is configured to be used to fuel the heaters of the plurality of reactor systems.

In some embodiments, the ammonia gas source is configured to be in direct fluid communication with each heater inlet of the plurality of reactor systems.

In some embodiments, the heater for each of the plurality of reactor systems is the same.

In some embodiments, a portion of the ammonia provided by the ammonia gas source is configured to be used to fuel the heaters of the plurality of reactor systems.

In a second aspect, the disclosure provides a method that includes: heating a first ammonia stream; disposing the first ammonia stream in an interior region of a first reactor including a catalyst; converting at least a portion of ammonia in the first ammonia stream to hydrogen and nitrogen, thereby forming a second ammonia stream; removing the second ammonia stream from the interior region of the first reactor; heating the second ammonia stream; disposing the second ammonia stream in an interior region of a second reactor including a catalyst; and converting at least a portion of ammonia in the second ammonia stream to hydrogen and nitrogen.

In certain embodiments, the method further includes separating at least a portion of the hydrogen from ammonia in the first and second reactors using a hydrogen-permeable membrane.

In certain embodiments, the method further includes removing at least a portion of the hydrogen in the first reactor from the first reactor using a sweep gas, and removing at least a portion of the hydrogen in the second reactor from the second reactor using a sweep gas.

In certain embodiments, the first and second ammonia streams are heated to a temperature of 525° C. to 625° C.

In certain embodiments, the method further includes removing a portion of the first ammonia stream, heating the portion of the first ammonia stream, and introducing the portion of the first ammonia stream into the second reactor.

In certain embodiments, the method further includes forming a third ammonia stream in the second reactor, removing the third ammonia stream from the interior region of the second reactor, heating the third ammonia stream, disposing the third ammonia stream in an interior region of a third reactor including a catalyst, and converting at least a portion of ammonia in the third ammonia stream to hydrogen and nitrogen.

In certain embodiments, the method further includes: removing first and second portions of the first ammonia stream; heating the first portion of the first ammonia stream; introducing the first portion of the first ammonia stream into the second reactor; heating the second portion of the first ammonia stream; and introducing the second portion of the first ammonia stream into the third reactor.

In certain embodiments, the first and second ammonia streams are heated to a temperature of 525° C. to 950° C.

BRIEF DESCRIPTION OF THE FIGURES

FIG. 6 depicts a schematic of a system.

DETAILED DESCRIPTION

Ammonia cracking to generate hydrogen and nitrogen is shown in reaction (1).

$$NH_3 \rightleftarrows \frac{1}{2} N_2 + \frac{3}{2} H_2 \tag{1}$$

$$\Delta H^0_{298} = 54.6 \ kJ/mol$$

Due to the endothermicity of reaction (1), external heat is supplied to sustain an acceptable rate of conversion, and to enhance the extent of conversion for this equilibrium-limited reaction.

Figure 1:
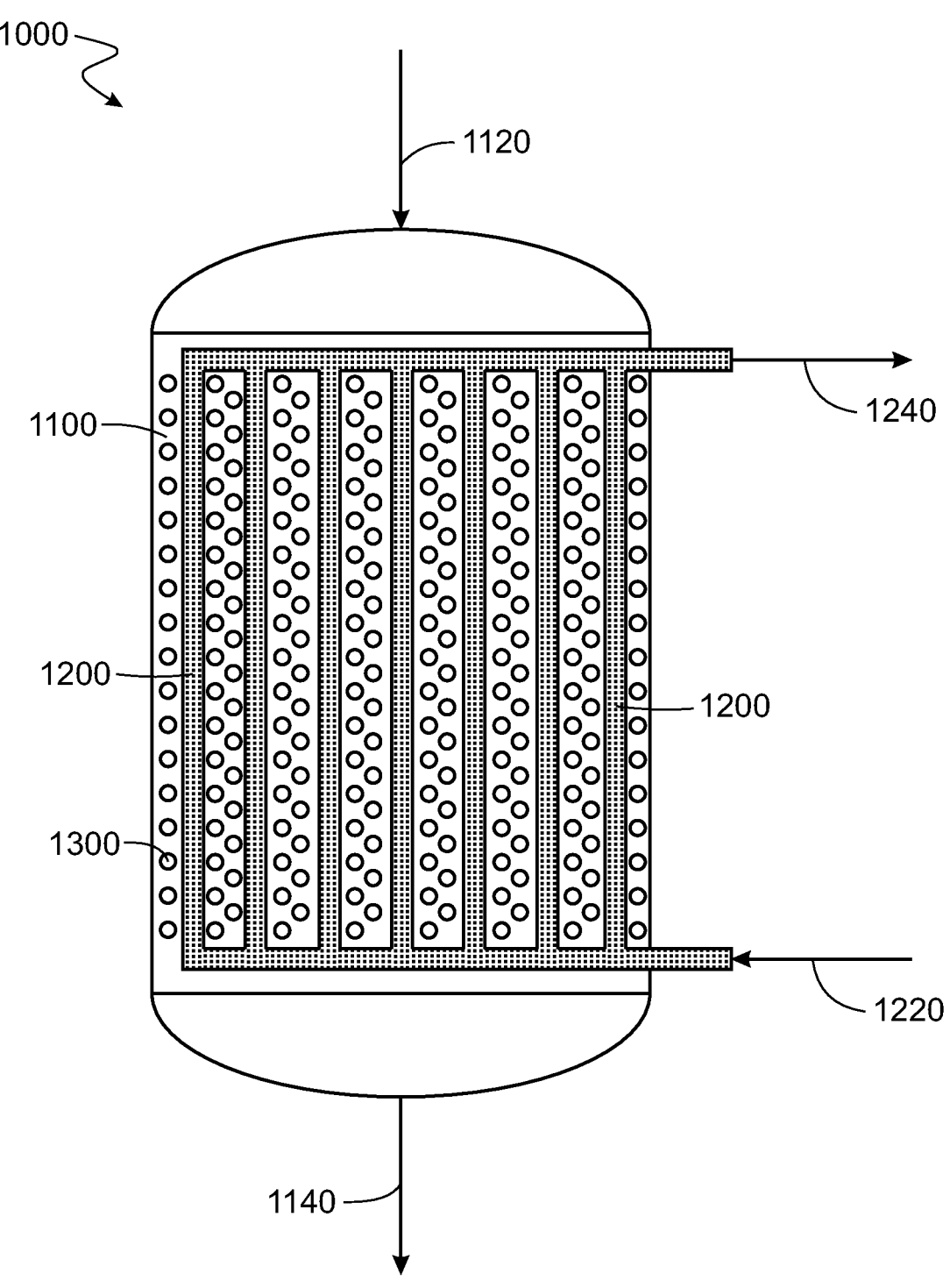
FIG. 1 depicts a schematic of a reactor.

FIG. 1 depicts a reactor 1000 that includes an inner space 1100. An inlet 1120 and an outlet 1140 allow fluid communication with the inner space 1100. The reactor includes a plurality of hollow fibers 1200, that include a hydrogen-permeable membrane, within the inner space 1100. An inlet 1220 and an outlet 1240 allow for fluid communication with the interior of the hollow fibers 1200. A catalyst 1300 is disposed in the inner space 1100, external to the hollow fibers 1200.

In some embodiments, the reactor 1000 is used for ammonia cracking to generate hydrogen and nitrogen. Ammonia enters the inner space 1100 of the reactor 1000 via the inlet 1120. As discussed in more detail below, the ammonia can be heated prior to introduction into the inner space 1100. In the inner space 1100, the ammonia interacts with the catalyst 1300 (see discussion below) which catalyzes the cracking of ammonia to provide hydrogen and nitrogen. The hydrogen permeates through the hydrogen-permeable membranes of the hollow fibers 1200 to enter the interior of the hollow fibers 1200. A sweep gas (e.g., steam, nitrogen) enters the interior of the hollow fibers 1200 via the inlet 1220 and exits the interior of the hollow fibers via the outlet 1240. Nitrogen, hydrogen and/or unconverted ammonia are removed from the inner space 1100 via the outlet 1140.

The permeation of hydrogen through the hydrogen-permeable membrane of the hollow fibers 1200 is driven by the difference in partial pressure of hydrogen in the interior of the hollow fibers 1200 and the exterior of the hollow fibers 1200. The driving force for hydrogen permeation through the hollow fibers 1200 can be enhanced by reducing the total gas pressure (e.g., by creating a vacuum) in the interior of the hollow fibers 1200, and/or by diluting the permeated hydrogen using an appropriate sweep gas (e.g. steam, nitrogen).

The hydrogen-permeable membranes of the hollow fibers 1200 selectively separate hydrogen from the reaction mixture. In the case of ammonia cracking, hydrogen that permeates through the hollow fibers 1200 is separated from nitrogen and unconverted ammonia. In general, the hollow fibers 1200 can have any appropriate physical shape. In some embodiments, the hollow fibers 1200 are tubular or flat panels, with the hydrogen-permeable membrane coated to the external surface. Examples of hydrogen-permeable membranes for the hollow fibers 1200 include a palladium-based membrane, such as a palladium alloy (e.g., palladium alloys with silver, gold, nickel and/or copper). In some embodiments, the hollow fibers are composed of the hydrogen-permeable membrane. In some embodiments, the hollow fibers 1200 include a porous metallic or ceramic membrane support.

In certain embodiments, the length of the hollow fibers 1200 is at least 10 (e.g., at least 20, at least 30, at least 40, at least 50, at least 60, at least 70, at least 80, at least 90, at least 100, at least 110, at least 120, at least 130, at least 140, at least 150, at least 160, at least 170, at least 180, at least 190) cm and/or at most 200 (e.g., at most 190, at most 180, at most 170, at most 160, at most 150, at most 140, at most 130, at most 120, at most 110, at most 100, at most 90, at most 80, at most 70, at most 60, at most 50, at most 40, at most 30, at most 20) cm.

In certain embodiments, the gap between the hollow fibers 1200 can be determined based on the expected operating conditions (e.g., flow rate, temperature, pressure etc.). Reducing the gap between the hollow fibers 1200 can induce turbulence in the flow, thereby reducing or eliminating the gas diffusion boundary layer, which can in turn enhance permeation, and thereby reaction conversion.

Without wishing to be bound by theory, it is believed that reactor productivity (reaction conversion and hydrogen yield per unit reactor volume) can be enhanced by maximizing the available permeation surface area relative to the packed catalyst volume. This is facilitated by close packing of the hollow fibers 1200 inside the catalyst bed.

For embodiments in which the reactor 1000 is used in ammonia cracking to provide hydrogen and nitrogen, the catalyst 1300 can, in general, be any catalyst suitable for such ammonia cracking. For example, the catalyst 1300 can be an earth-abundant non-noble metal catalyst (e.g., a nickel-based catalyst, a cobalt-based catalyst, an iron-based catalyst) or a noble metal catalyst (e.g., ruthenium-based catalyst). The catalyst 1300 is packed in the inner space 1100 of the reactor 1000 between the hollow fibers 1200. The size, shape and structure of the catalyst 1300 can be tuned as appropriate to provide good catalyst effectiveness factor and heat transfer in the reactor 1000. In certain embodiments, the catalyst 1300 is a structured catalyst (e.g., a catalytic or catalyst coated metal or ceramic foam, a monolith).

Figure 2:
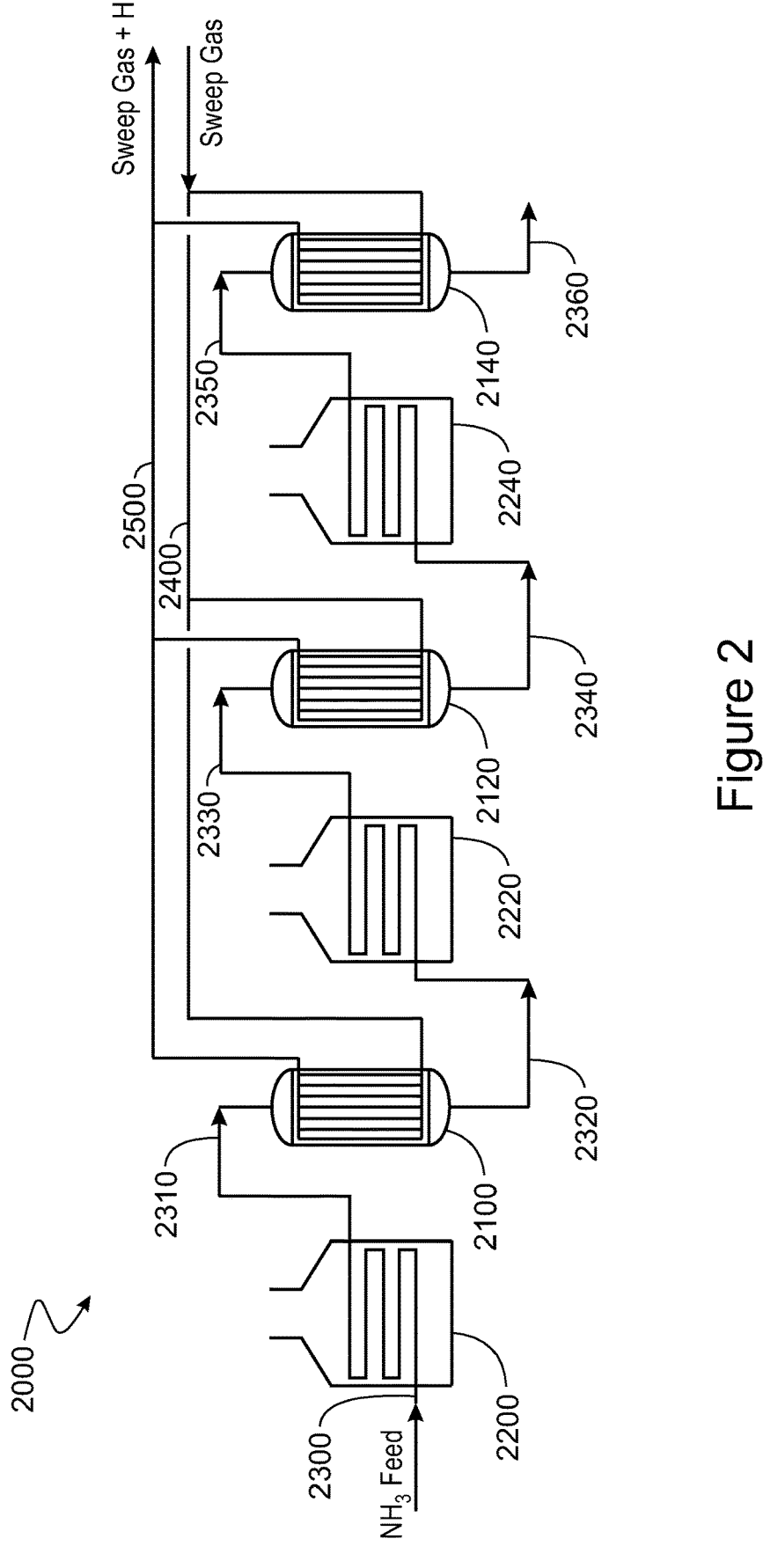
FIG. 2 depicts a schematic of a system.

FIG. 2 depicts a system 2000. The system 2000 includes reactors 2100, 2120, and 2140 and heaters 2200, 2220, and 2240. The reactors 2100, 2120, and 2140 include the components of the reactor 1000.

A gas stream 2300, containing ammonia, is sent to the heater 2200 where the ammonia is heated to generate a gas stream 2310 containing heated ammonia. The gas stream 2310 is introduced into the inner space 1100 of the reactor 2100 via the inlet 1120 where at least a portion of the heated ammonia is converted to hydrogen and nitrogen. Hydrogen can permeate through the hydrogen-permeable membranes of the hollow fibers 1200 of the reactor 2100 to enter the interior of the hollow fibers 1200. The hydrogen that permeates the hollow fibers 1200 of the reactor 2100 leaves the reactor 2100 in a gas stream 2500. Unconverted ammonia, nitrogen and the hydrogen that did not permeate the hollow fibers 1200 of the reactor 2100 leave the reactor 2100 as a gas stream 2320. Like the heater 2200, the heaters 2220 heats the gas stream 2320 to form a gas stream 2330 containing heated ammonia. The reactor 2120 operates in a fashion similar to that of the reactor 2100. The gas stream 2330 is introduced into the inner space 1100 of the reactor 2120 via the inlet 1120 where at least a portion of the heated ammonia is converted to hydrogen and nitrogen. Hydrogen that permeated the hollow fibers 1200 of the reactor 2120 leaves the reactor 2120 in the gas stream 2500, and the unconverted ammonia, nitrogen and hydrogen that did not permeate the hollow fibers 1200 leave the reactor 2120 in a gas stream 2340. Similar to the heaters 2200 and 2220, a heater 2240 heats the gas stream 2340 to provide a gas stream 2350 containing heated ammonia. The reactor 2140 operates in a fashion similar to that of the reactors 2100 and 2120. The gas stream 2350 is introduced into the inner space 1100 of the reactor 2140 via the inlet 1120 where at least a portion of the heated ammonia is converted to hydrogen and nitrogen. Hydrogen that permeated the hollow fibers 1200 of the reactor 2140 leaves the reactor 2120 in the gas stream 2500, and the unconverted ammonia, nitrogen and hydrogen that did not permeate the hollow fibers 1200 leave the reactor 2140 in a gas stream 2360.

A gas stream 2400, containing a sweep gas, is in fluid communication with the interiors of the hollow fibers 1200 of the reactors 2100, 2120, and 2140 of each of the reactors 2100, 2120, and 2140. The sweep gas operates as described above with respect to FIG. 1. The gas stream 2500, containing the sweep gas and hydrogen that has permeated the hollow fibers 1200, exits the reactors 2100, 2120 and 2140 as described above.

Without wishing to be bound by theory, it is believed that the reactor temperature (e.g., the temperature of the catalyst bed) drops along the length of the reactor due to the endothermic nature of the ammonia cracking progress. Thus, using multiple reactors, each with a separate catalyst bed, and heating the ammonia before it enters each reactor can result in relatively high ammonia cracking efficiency.

In general, the heaters 2200, 2220 and 2240 can be any appropriate heaters. Examples of the heaters 2200, 2220, and 2240 include fired heaters, electric heaters, and heat exchangers. Fired heaters can be fueled by ammonia, hydrogen and/or natural gas. Typically, the reactors 2100, 2120, and 2140 are insulated and operated adiabatically.

The gas streams 2310, 2330, and 2350 have a temperature that is compatible with the membrane integrity. In some embodiments, the temperature of the gas streams 2310, 2330, and/or 2350 is at least 525 (e.g., at least 530, at least 535 at least 540, at least 545, at least 550, at least 555, at least 565, at least 570, at least 575, at least 580, at least 585, at least 590, at least 595, at least 600, at least 605, at least 610, at least 615, at least 620) ° C. and/or at most 625 (e.g., at most 620, at most 615, at most 610, at most 605, at most 600, at most 595, at most 590, at most 585, at most 580, at most 575, at most 570, at most 565, at most 560, at most 555, at most 550, at most 545, at most 540, at most 535, at most 530) ° ° C. As discussed below in FIG. 5, reactors can be employed that do not include hollow fibers including a hydrogen-permeable membrane allowing higher temperatures (e.g., at most 950°) C. to be used.

Typically, the temperature of the gas stream drops along the length of the catalyst bed due to the endothermicity of the ammonia cracking reaction. Thus, the length of the catalyst bed can be adjusted to address this effect. In some embodiments, the length of the catalyst bed is selected such that the reaction rate will not fall below a temperature too low for practical operation (e.g., about 450°) C. Referring to FIG. 2, for example, the gases in the gas stream 2310 exiting the reactor 2100 is heated to provide the gas stream 2320 containing ammonia at the desired temperature (e.g., the maximum allowable temperature), which is introduced into the reactor 2120. Although FIG. 2 depicts an arrangement of reactors, more generally, the number of reactors used in a system may be determined by various parameters, such as the ammonia feed capacity, which determines the rate of temperature drop in each reactor. In certain embodiments, the number of reactors is at least two (e.g., at least three, at least four, at least five).

As shown in FIG. 2, the gas streams 2310, 2330 and 2350 are introduced at the tops of reactors 2100, 2120, and 2140, respectively. The sweep gas in the gas stream 2400 is introduced to the bottoms of the reactors 2100, 2120, and 2140, thereby flowing counter-currently to the gas streams 2310, 2330 and 2350. The counter-current flow help maintain the hydrogen permeation driving force at consistently high levels, thereby maximizing hydrogen recovery from the system. Alternatively, the gas streams 2310, 2330 and 2350 can be introduced at the bottoms of the reactors 2100, 2120, 2140, respectively and the gas stream 2400 can be introduced at the top of the reactors. A co-current flow of the gas streams 2310, 2330 and 2350 and the gas stream 2400 can also be employed.

In certain embodiments, the sweep gas in the gas stream 2400 can be heated to a temperature that is compatible with the membrane integrity. In certain embodiments, the gas stream 2400 is heated to a temperature of at least 550 (e.g., at least 555, at least 565, at least 570, at least 575, at least 580, at least 585, at least 590, at least 595) ° C. and/or at most 600 (e.g., at most 595, at most 590, at most 585, at most 580, at most 575, at most 570, at most 565, at most 560, at most 555) ° C.

Figure 3:
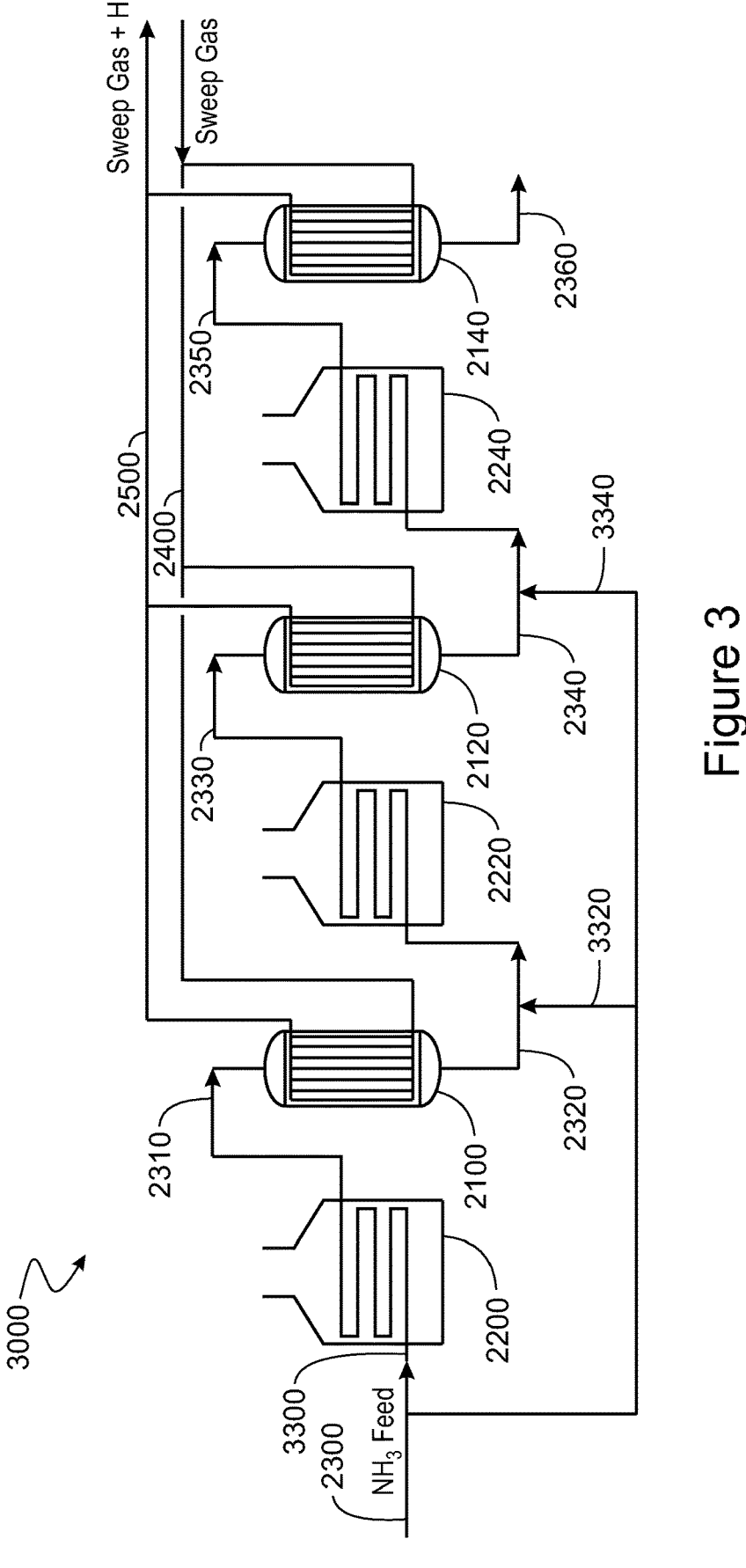
FIG. 3 depicts a schematic of a system.

FIG. 3 depicts a system 3000. The system 3000 includes the components of the system 2000. However, unlike in the system 2000, in the system 3000, the gas stream 2300 is divided into the gas streams 3300, 3320 and 3340, which each contain ammonia. The gas stream 3300 is introduced into the heater 2200, the gas stream 3320 is introduced into the heater 2220, and the gas stream 3340 is introduced into the heater 2240. In this configuration, additional ammonia is mixed with the intermediate gas steam 2320 and 2340 before entering the heaters 2220 and 2240, respectively, to increase the reaction rate in the heaters 2220 and 2240. Thus, the gas stream 2300 is in direct fluid communication with each of the heaters 2200, 2220, and 2240.

Figure 4:
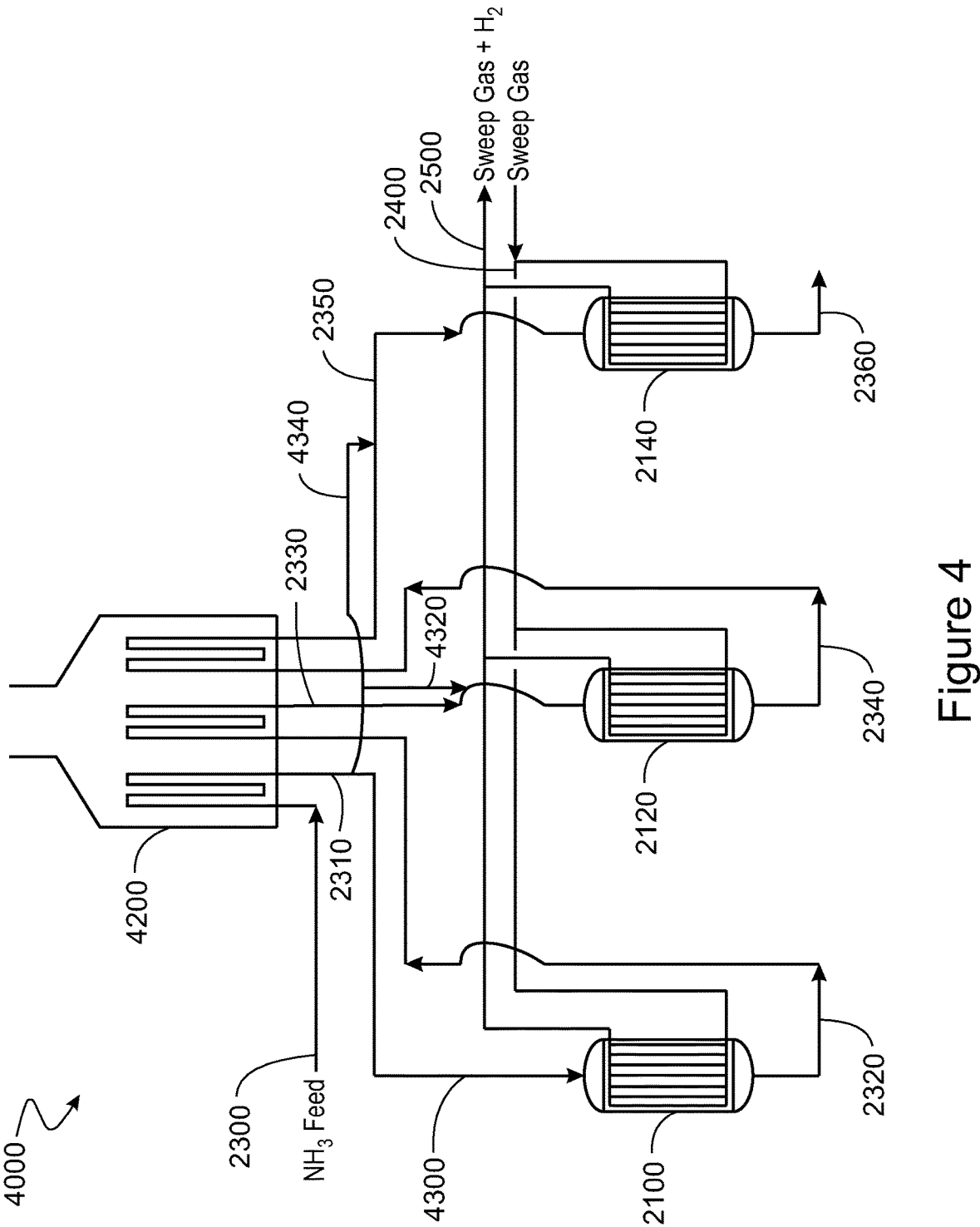
FIG. 4 depicts a schematic of a system.

FIG. 4 depicts a system 4000. The system 4000 includes the components of the system 3000. However, unlike the system 3000, the system 4000 includes a single heater 4200 rather than the heaters 2200, 2220, and 2240. The heater 4200 provides gas stream heating for each of the gas streams 2310, 2330 and 2350. The gas stream 2300, containing ammonia, is input into the heater 4200 and heated to form the gas stream 2310. The gas stream 2310 is separated into the gas streams 4300, 4320 and 4340, which each contain ammonia. The gas stream 4300 is introduced into the reactor 2100, the gas stream 4320 is introduced into the reactor 2120, and the gas stream 4340 is introduced into the reactor 2140. This configuration may improve energy efficiency relative to the system 2000 and/or 3000.

Figure 5:
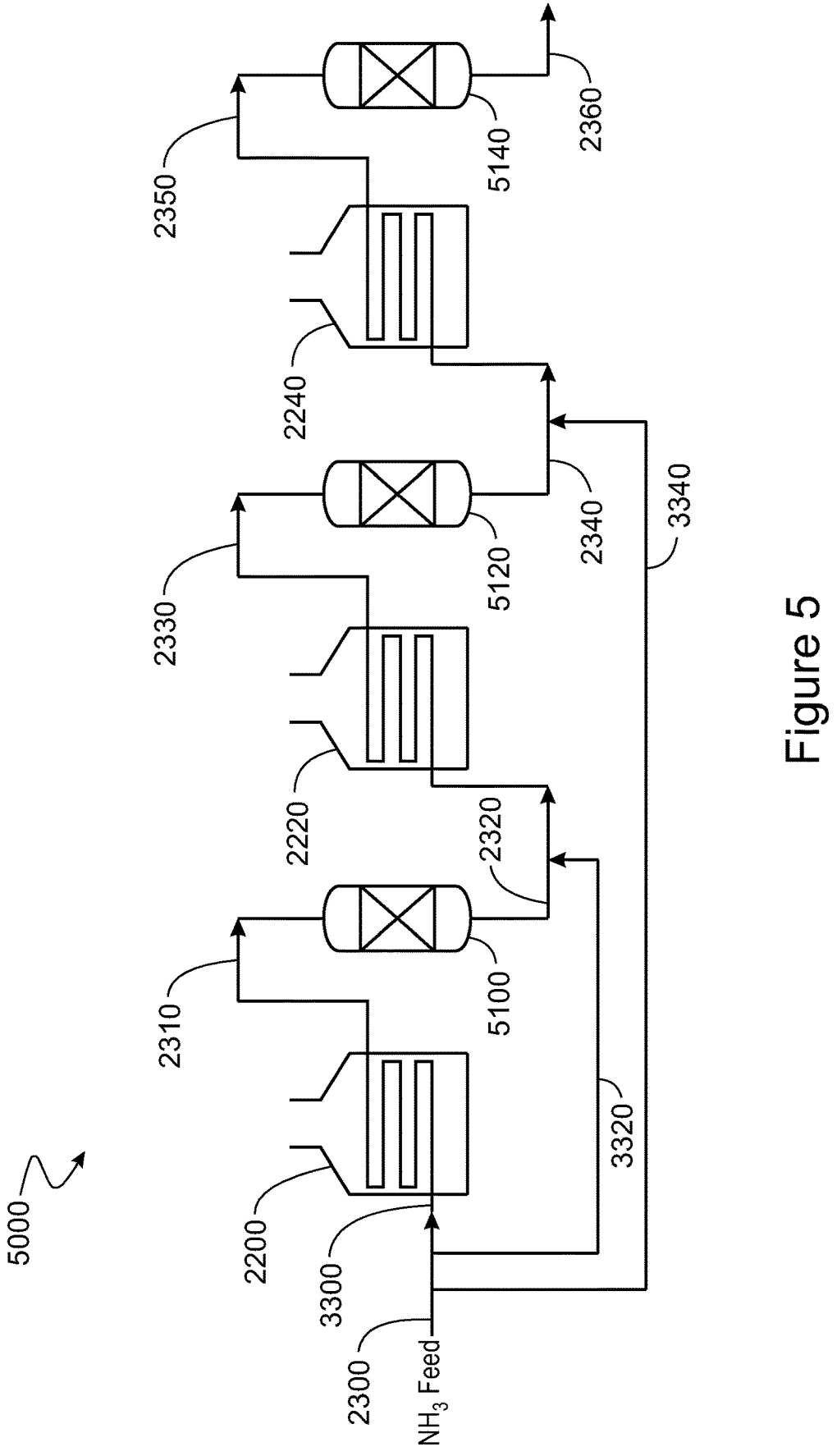
FIG. 5 depicts a schematic of a system.

FIG. 5 depicts a system 5000. The system 5000 includes the components of the system 3000. However, unlike the system 3000, the system 5000 includes the reactors 5100, 5120, and 5140, rather than the reactors 2100, 2120, and 2140. The reactors 5100, 5120, and 5140 do not contain hydrogen-permeable membranes. Thus, the gas streams 2310, 2330, and 2350 can be heated to higher temperatures (e.g., at most 950°) C. that would not be compatible with the reactors 2100, 2120, and 2140 with hydrogen-permeable membranes (e.g., palladium-based membranes), thereby enhancing the reaction rates.

In some embodiments, the upper limit of the temperature of the gas streams 2310, 2330, and 2350 is determined by the stability of the catalyst 1300. In some embodiments, the catalyst 1300 is a nickel-based ammonia cracking catalyst, and the temperature of the gas streams 2310, 2330, and/or 2350 is at least 525 (e.g., at least 550, at least 600, at least 650, at least 700, at least 750, at least 800, at least 850) ° C. and/or at most 900 (e.g., at most 850, at most 800, at most 750, at most 700, at most 650, at most 600, at most 550) ° C. In some embodiments, the catalyst 1300 is a ruthenium or cobalt-based catalyst, and the temperature of the gas streams 2130, 2330, and/or 2350 is at least 525 (e.g., at least 550, at least 575, at least 600, at least 625) ° C. and/or at most 650 (e.g., at most 625, at most 600, at most 575, at most 550) ° C.

The system 5000 does not include the sweep gas stream 2400 and 2500, and the reactors 5100, 5120, and 5140 do not contain the hollow fibers 1200. Therefore, the inner space of the reactors 5100, 5120, and 5140 can be completely filled with the catalyst 1300 as per catalyst loading procedures.

Thus, the hydrogen produced in the system 5000 is not separated from the nitrogen and unconverted ammonia. Instead, the hydrogen, nitrogen and unconverted ammonia leave the system 5000 via the gas stream 2360.

Figure 6:
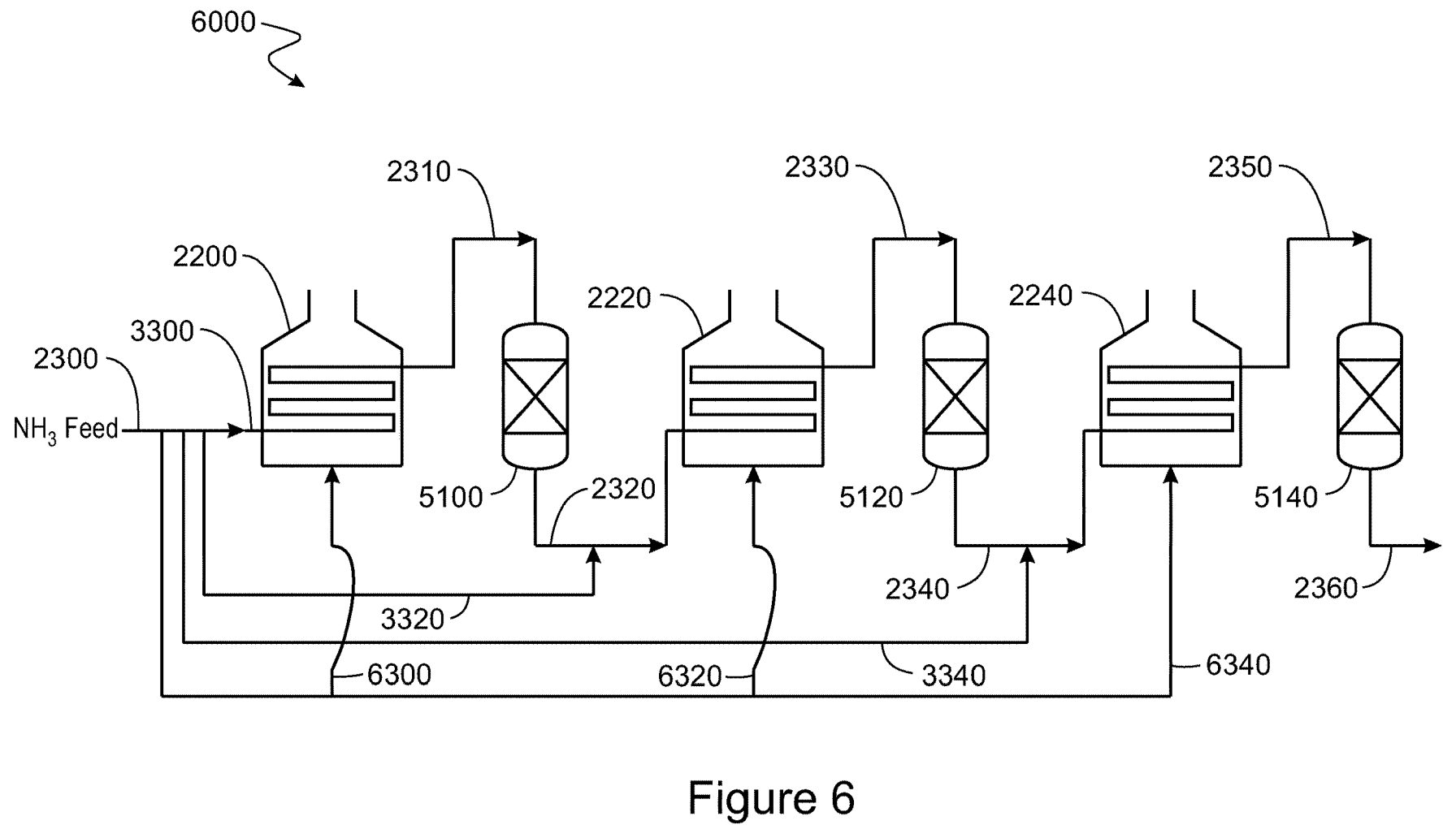

FIG. 6 depicts a system 6000. The system 6000 includes the components of the system 5000. However, unlike the system 5000, the system 6000 includes the gas streams 6300, 6320 and 6340. The gas streams 6300, 6320 and 6340 are separated from the gas stream 2300 and contain ammonia. The gas streams 6300, 6320 and 6340 are input into the heaters 5200, 5220, and 5240, respectively, as supplementary fuel. This configuration can reduce carbon dioxide emissions relative to the system 5000. The gas streams 6300, 6320 and 6340 can be supplemented with natural gas and/or hydrogen to reduce NOx emissions.

OTHER EMBODIMENTS

While certain embodiments have been disclosed above, the disclosure is not limited to such embodiments.

As an example, while embodiments have been disclosed that include the components of the systems 2000, 3000, 4000, 5000 and 6000, the disclosure is not limited to such embodiments. For example, the system 2000, 3000, 4000, 5000 and/or 6000 can contain one or more additional components not depicted. Additionally, or alternatively, the system 2000, 3000, 4000, 5000 and/or 6000 may not contain each component depicted. Further, components of the system 2000, 3000, 4000, 5000 and/or 6000 may be reconfigured as appropriate. In certain embodiments, the system 2000, 3000, 4000, 5000 and/or 6000 includes two, three, four, five or ten reactors. In certain embodiments, the number of reactors is estimated by a simulation and/or engineering design.

As another example, the systems and methods of the disclosure can be used for any reaction that is thermodynamically limited to low conversions due to equilibrium. In some embodiments, the systems and methods of the disclosure can be used for steam reforming of hydrocarbons (e.g., methane). In some embodiments, the systems and methods of the disclosure can be used for dehydrogenation reactions (e.g., propane dehydrogenation). In some embodiments, the systems and methods can be applied to hydrogenation reactions.

As a further example, the systems and methods of the disclosure can be used in an exothermic reaction (e.g., a hydrogenation reaction). In certain embodiments, the systems and method of the disclosure can include inter-stage cooling, such as for exothermic reactions (e.g. hydrogenation reaction).

What is claimed:

1. A system, comprising:
   an ammonia gas source;
   a heater;
   a plurality of reactor systems comprising first and second reactor systems, each reactor system comprising:
       a reactor comprising:
           a housing defining an internal space;
           a first inlet in fluid communication with the internal space of the housing;
           a first outlet in fluid communication with the internal space of the housing;
           an ammonia cracking catalyst disposed in the internal space of the housing;
           a plurality of hollow fibers within the internal space, each of the hollow fibers defining an interior and comprising a hydrogen-permeable membrane; and 9 10 a second inlet and a second outlet that are each in fluid communication with the interiors of the plurality of hollow fibers, wherein, for each reactor system, the internal space of the housing that is in fluid communication with the first inlet and the first outlet is a space that is external to a space occupied by the plurality of hollow fibers;

wherein the system is configured so that during use of the system:

the ammonia gas source provides a first gas stream comprising ammonia;

the heater heats the first gas stream to provide a heated first gas stream comprising heated ammonia;

the heated first gas stream is introduced into the internal space of the first reactor via the first inlet of the first reactor where a portion of the heated ammonia is converted to hydrogen;

a second gas stream comprising ammonia exits the first reactor via the first outlet of the first reactor;

a portion of the first gas stream is configured to be combined with the second gas stream;

the heater heats the second gas stream to provide a heated second gas stream comprising heated ammonia; and the heated second gas stream is introduced into the internal space of the second reactor via the first inlet of the second reactor where a portion of the heated ammonia is converted to hydrogen.

2. The system of claim 1, further comprising a third reactor system wherein the system is configured so that during use of the system:

a third gas stream comprising ammonia exits the second reactor via the first outlet of the second reactor;

a portion of the first gas stream is configured to be combined with the third gas stream;

the heater is configured to heat the third gas stream to provide a heated third gas stream comprising heated ammonia; and the heated third gas stream is introduced into the internal space of the third reactor via the first inlet of the third reactor where a portion of the heated ammonia is converted to hydrogen.

3. The system of claim 1, wherein the catalyst is disposed in the internal space of the housing of the reactors, external to the plurality of hollow fibers.

4. The system of claim 1, further comprising a first gas source configured to be in fluid communication with the second inlet of each reactor of the plurality of reactor systems.

5. The system of claim 4, further comprising a second gas source configured to be in fluid communication with the second outlet of each reactor of the plurality of reactor systems.

6. The system of claim 1, wherein a portion of the ammonia provided by the ammonia gas source is configured to be used to fuel the heater.

7. The system of claim 2, wherein the catalyst is disposed in the internal space of the housing of the reactors, external to the plurality of hollow fibers.

8. The system of claim 2, further comprising a first gas source configured to be in fluid communication with the second inlet of each reactor of the plurality of reactor systems.

9. The system of claim 8, further comprising a second gas source configured to be in fluid communication with the second outlet of each reactor of the plurality of reactor systems.

* * * * *